United States Patent
Maass

(10) Patent No.: US 8,370,023 B2
(45) Date of Patent: Feb. 5, 2013

(54) DRIVER ASSISTANCE SYSTEM

(75) Inventor: Alexander Maass, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 826 days.

(21) Appl. No.: 12/083,271

(22) PCT Filed: Oct. 5, 2006

(86) PCT No.: PCT/EP2006/067103
§ 371 (c)(1),
(2), (4) Date: Apr. 14, 2009

(87) PCT Pub. No.: WO2007/042462
PCT Pub. Date: Apr. 19, 2007

(65) Prior Publication Data
US 2009/0216404 A1   Aug. 27, 2009

(30) Foreign Application Priority Data
Oct. 7, 2005 (DE) .......................... 10 2005 048 014

(51) Int. Cl.
*A01B 69/00* (2006.01)
(52) U.S. Cl. ....................................................... 701/41
(58) Field of Classification Search .................... None
See application file for complete search history.

(56) References Cited

U.S. PATENT DOCUMENTS

| | | | |
|---|---|---|---|
| 5,765,116 A | | 6/1998 | Wilson-Jones |
| 6,282,478 B1 | | 8/2001 | Akita |
| 2003/0156015 A1 | * | 8/2003 | Winner et al. ............. 340/425.5 |
| 2005/0182539 A1 | * | 8/2005 | Maass ............................. 701/41 |
| 2005/0228580 A1 | * | 10/2005 | Winner et al. ................ 701/200 |
| 2005/0228588 A1 | * | 10/2005 | Braeuchle et al. ............ 701/301 |
| 2009/0204304 A1 | * | 8/2009 | Urban et al. .................... 701/96 |
| 2009/0299576 A1 | * | 12/2009 | Baumann et al. ............... 701/45 |

FOREIGN PATENT DOCUMENTS

| | | |
|---|---|---|
| DE | 101 14 470 | 9/2002 |
| DE | 102 005 024382.7 | 12/2006 |

* cited by examiner

*Primary Examiner* — Thomas Tarcza
*Assistant Examiner* — Adam Alharbi
(74) *Attorney, Agent, or Firm* — Kenyon & Kenyon LLP

(57) ABSTRACT

A driver assistance system having a lane-keeping function, having a device for detecting the lanes on a roadway, and a control unit for intervening in the steering system of the vehicle for lane-keeping. Means are provided in the driver assistance system for detecting the position of the vehicle with respect to the lane marking of the lane. Furthermore, means are provided for detecting a travel of the vehicle through a curve. The control unit executes its control function as a function of the position of the vehicle on the lane and as a function of the cornering. The intervention depends on whether the vehicle is located on the inner side of the curve or on the outer side of the curve.

11 Claims, 2 Drawing Sheets

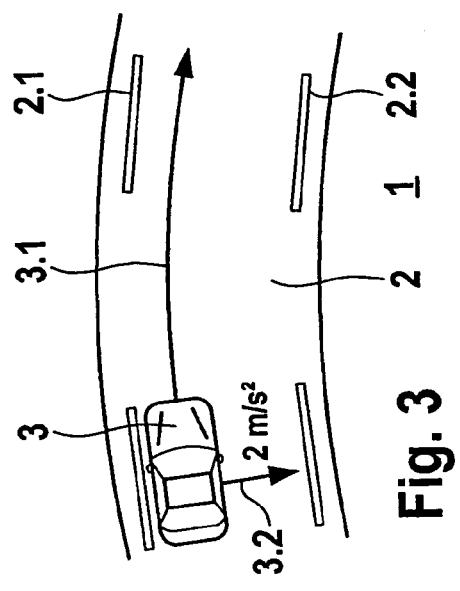
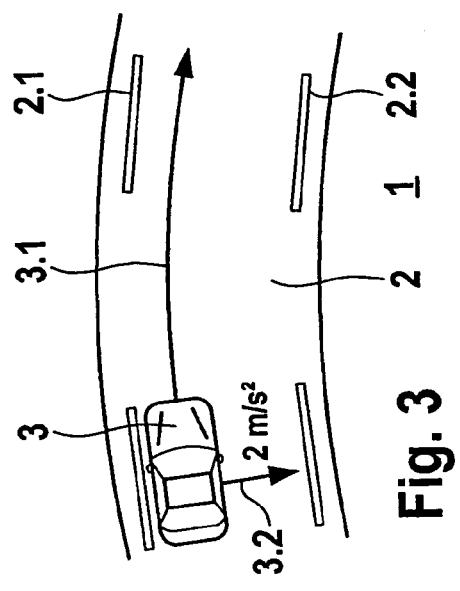
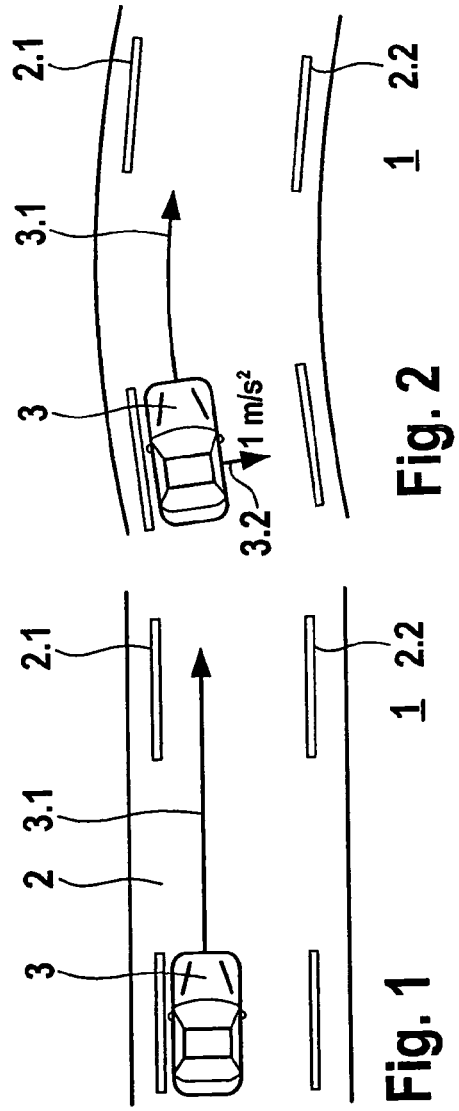
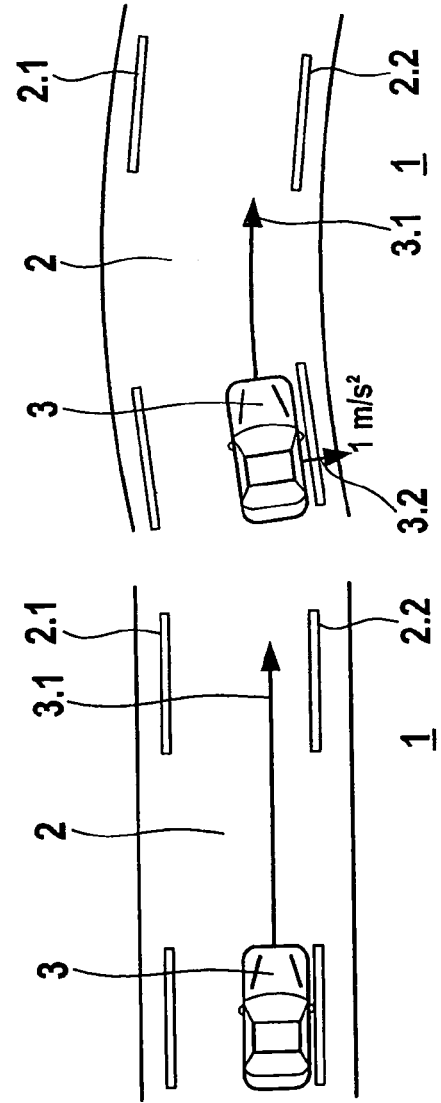

Fig. 7
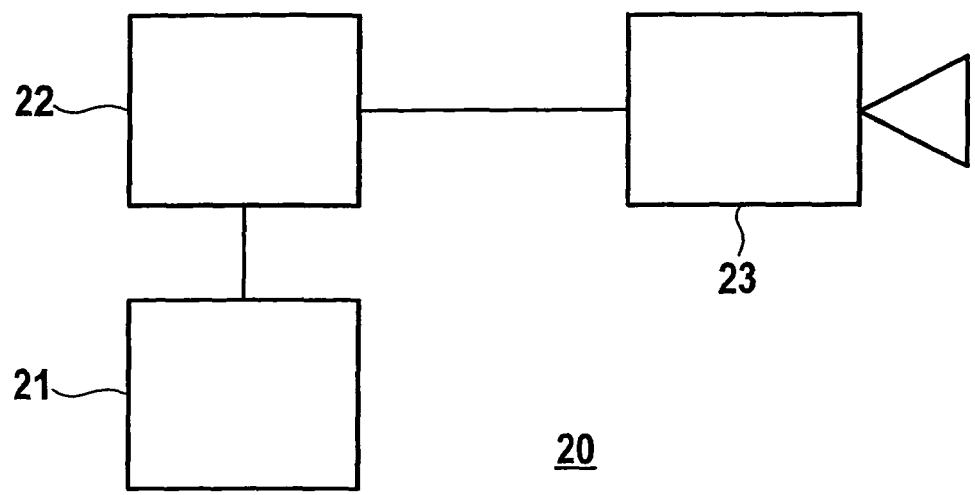
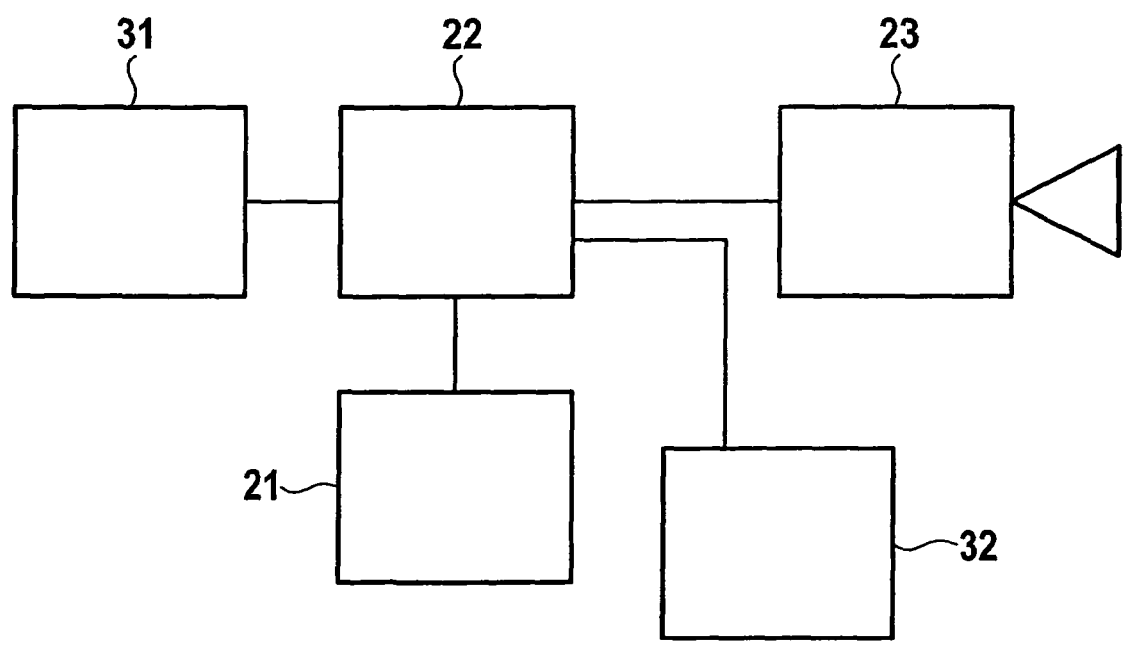
Fig. 8

DRIVER ASSISTANCE SYSTEM

BACKGROUND INFORMATION

A lane change assistant is described in German Patent No. DE 101 14 470. A video system is provided as a sensor device using which the lane markings on the roadway and thus the lateral position of the host vehicle relative to the currently traveled lane may be detected. If the lateral position of the vehicle deviates from the lane center to one or the other side by more than a certain tolerance limit, an automatic regulating intervention in the steering takes place in order to return the vehicle approximately to the lane center. The driving comfort for the driver is thus considerably enhanced and traffic safety is also increased since the driver is able to pay full attention to the traffic situation. However, if the driver wants to change lanes intentionally, i.e., to initiate a passing process, he must exert greater forces on the steering wheel when the lane-keeping function is activated in order to overcome the forces caused by the regulating intervention of the lane-keeping assistant. For this reason, it is provided in the known system that the lane-keeping function is at least temporarily deactivated when a lane change intention of the driver is detected, e.g., when the turn signal is operated.

Moreover, a lane-keeping assistant for motor vehicles including a sensor device for detecting the lanes on the roadway, a control unit which exerts a force on the vehicle's steering via an actuator to hold the vehicle in the lane, and a device for detecting the lane change intention of the driver is described in German Patent No. DE 102 005 024382.7. The control unit is designed in such a way that, when a lane change intention is detected, the force exerted on the steering is modifiable asymmetrically in the sense of an easier lane change. Furthermore, in the event of a detected lane change intention from the host vehicle's lane to a target lane, the absolute value of the force exerted on the vehicle's steering is a function of the vehicle's deviation from a setpoint trajectory in such a way that the force for lateral positions between the setpoint trajectory on the host vehicle's lane and the setpoint trajectory on the target lane is decreased or equal to zero; however, it increases again beyond the setpoint trajectory of the target lane.

SUMMARY OF THE INVENTION

The present invention has the advantage that the comfort and safety of a driver assistance system having a lane-keeping function are further enhanced. It is not taken into account in previously known driver assistance systems that differing steering forces occur on a winding road when the vehicle travels along the inner curve or closer to the outer curve of a lane. During fast travel close to the inner-curve lane markings, the driver must apply greater force to the steering wheel because he must overcome the reset force of the steering and additionally the artificially generated force of the lane-keeping system. The present invention ensures that a sporty driving style along the inner-curve lane markings is not made more difficult by the driver assistance system. Moreover, it is ensured that, when traveling along the outer curve in gently winding curves, the driver does not have to apply additional force on the steering wheel.

BRIEF DESCRIPTION OF THE DRAWINGS

FIG. 1 shows a traffic zone including a vehicle traveling straight ahead close to the left lane marking.

FIG. 2 shows a traffic zone including a vehicle negotiating a curve close to the outer-curve marking.

FIG. 3 shows a traffic zone including a vehicle negotiating a curve at high speed close to the outer-curve marking.

FIG. 4 shows a traffic zone including a vehicle traveling straight ahead close to the right lane marking.

FIG. 5 shows a traffic zone including a vehicle negotiating a curve close to the inner-curve marking.

FIG. 6 shows a traffic zone including a vehicle negotiating a curve at high speed close to the inner-curve marking.

FIG. 7 shows a block diagram including important components of a driver assistance system.

FIG. 8 shows a block diagram including important components of a driver assistance system.

DETAILED DESCRIPTION

When negotiating curves, support by a driver assistance system having a lane guiding function is effected by the fact that, when approaching a lane marking, a torque acting in the direction of lane-keeping is applied to the steering column. This torque is typically applied by an appropriately controlled electric motor. This steering intervention ensures that the vehicle distances itself again from the lane marking delimiting the lane. A stronger intervention is necessary in curves negotiated very fast and/or in tight curves in order to prevent the vehicle from deviating in the direction of the outer side of the curve or lane. In contrast, when negotiating such curves, an undesirable deviation in the direction of the inner side or the respective lane marking is only possible with great difficulty since the design of the steering, due to its imminent reset force, already pushes the vehicle in the direction of a straight course. Therefore, during an approach to an outer curve, the driver assistance system may intervene in the steering all the more intensively the tighter the curve is or the faster the curve is negotiated. On the other hand, during an approach to the inner-curve lane marking, the driver assistance system may intervene the less intensively the faster the vehicle travels or the tighter the negotiated curve is.

The vehicle's transverse acceleration is advantageously used as the decision criterion. In normal driving operation, this transverse acceleration may be between approximately 0 m/sec$^2$ and approximately 4 m/sec$^2$, for example. A threshold value of the transverse acceleration is advantageously established. The effects on the steering system are more or less intensive below and above this threshold value.

Exemplary embodiments of the present invention are explained in greater detail in the following with reference to the drawings. An only partially represented traffic zone is indicated in all figures using reference numeral 1 in which a vehicle 3 equipped with a driver assistance system travels. The direction of travel of vehicle 3 is indicated by an arrow 3.1. The length of the arrow indicates the rate of the speed of travel. In FIG. 1, vehicle 3 travels on a lane 2 delimited by lane markings 2.1, 2.2 on an essentially straight section of traffic zone 1. The position of vehicle 3 is close to the "outer" lane marking 2.1. Only a slight intervention of the driver assistance system is needed on this straight section of lane 2 in order to keep vehicle 3 safely in the lane. FIG. 2 shows vehicle 3 when negotiating a winding section of lane 2. In this case, vehicle 3 travels on the outer edge of the curve along outer lane marking 2.1. The vehicle is subjected here to a transverse acceleration of approximately 1 m/sec$^2$. The direction and the rate of the transverse acceleration are indicated by arrow 3.2. In order to be able to keep vehicle 3 safely in the lane in this driving situation, an approximate intervention of medium intensity of the driver assistance system into the steering of vehicle 3 is needed. FIG. 3 shows a driving situation in which vehicle 3 travels through a curve similar to the one represented in FIG. 2, but at a substantially higher rate of speed. This results in an even higher transverse acceleration having a value of approximately 2 m/sec². A comparatively intensive intervention of the driver assistance system into the steering is needed in this driving situation in order to keep vehicle 3 safely in lane 2.

In the driving situations described in the following, vehicle 3 travels on the inner edge of the curve, i.e., along lane marking 2.2. In FIG. 4, vehicle 3 travels on an essentially straight section in the right edge area of lane 2. In the event of an imminent deviation from lane 2, only a slight steering intervention by the driver assistance system is needed in order to keep vehicle 3 in lane 2, similar to the driving situation represented in FIG. 1. In the driving situation shown in FIG. 5, vehicle 3 travels on a winding stretch close to the right lane marking 2.2 of lane 2, i.e., on the inner edge of the curve. The transverse acceleration of vehicle 3 here is approximately 1 m/sec². A comparatively slight steering intervention of the driver assistance system is sufficient in this driving situation in order to keep vehicle 3 safely in the lane. Finally, in the driving situation shown in FIG. 6, vehicle 3 travels through the curve at a higher speed, which also results in higher transverse acceleration of approximately 2 m/sec². No intervention into the steering is to be provided in this driving situation because vehicle 3 remains in lane 2 even without additional steering intervention due to the vehicle dynamics. Therefore, for the present invention it is important to recognize whether vehicle 3 travels through a curve and which position it assumes with respect to the edges of lane 2 (lane markings 2.1, 2.2). The position of vehicle 3 with respect to the edges of lane 2 may be detected using video sensor 23 of driver assistance system 20, 30 which already detects lane markings 2.1, 2.2 of lane 2 and the position of vehicle 3 with respect to lane 2. Traveling through a curve is detected in a simple manner via a sensor 31 which is sensitive to the transverse acceleration of vehicle 3. In an alternative embodiment variant of the present invention, the shape of a curve may also be detected based on lane markings 2.1, 2.2. If vehicle 3 is equipped with a navigation system 32, a shape of a curve may also be recognized based on the stored geo-data about the shape of the road.

FIG. 7 shows a simplified block diagram including important components of a driver assistance system 20. Driver assistance system 20 includes at least one video sensor 23, e.g., a CCD or a CMOS camera which is connected to a control unit 22. The control unit is connected to the steering system of vehicle 3. Video sensor 23 detects lane markings 2.1, 2.2 (see FIGS. 1 through 6) and, possibly in collaboration with additional sensors such as infrared sensors scanning the lane, the position of vehicle 3 on the lane, in particular the position of vehicle 3 with respect to lane markings 2.1 and 2.2. The signals of the sensors are processed by control unit 22. In the event of an imminent deviation of vehicle 3 from its setpoint trajectory on lane 2, control unit 22 intervenes in steering system 21 of vehicle 3 in order to keep the vehicle on the setpoint trajectory. FIG. 8 in turn shows important components of a driver assistance system 30 in which a sensor 31 for detecting the transverse acceleration of vehicle 3 is additionally provided. Sensor 31 is used for detecting cornering. Cornering may furthermore be detected via the geo-data stored in a navigation system 32.

What is claimed is:

1. A driver assistance system for a vehicle having a lane-keeping function, comprising:
   a device for detecting lanes on a roadway;
   a control unit for intervening in a steering system of the vehicle for lane-keeping;
   a position detecting arrangement for detecting a position of the vehicle with respect to edges of a lane;
   a cornering detecting arrangement for detecting cornering of the vehicle, wherein the control unit executes a control function as a function of the position of the vehicle on the lane and as a function of the cornering;
   a transverse acceleration detecting arrangement for detecting a transverse acceleration of the vehicle; and
   an intervention arrangement for performing at least one of the following: (i) performing, during an approach to an outer curve, an intervention of steering whose intensity increases with the tightness of the curve or the speed of negotiating the curve, and (ii) performing, during an approach to an inner-curve lane marking, an intervention of steering whose intensity decreases with the tightness of the curve or the speed of negotiating the curve.

2. The driver assistance system according to claim 1, wherein the control unit executes the control function as a function of the position of the vehicle in the lane and as a function of the detected transverse acceleration of the vehicle.

3. The driver assistance system according to claim 1, wherein the control unit executes the control function as a function of the position of the vehicle in the lane and as a function of data of a navigation system.

4. The driver assistance system according to claim 2, wherein the intervention arrangement is also configured for performing, during travel on a winding lane with the vehicle being positioned in an outside area of the lane and traveling below a threshold value of the transverse acceleration, an intervention of medium intensity in the steering system of the vehicle in the event of a deviation of the vehicle from a setpoint trajectory, with the aim of keeping to the lane.

5. The driver assistance system according to claim 2, wherein the intervention arrangement is also configured for performing, during travel on a winding lane with the vehicle being positioned in an outside area of the lane and traveling above a threshold value of the transverse acceleration, an intensive intervention in the steering system of the vehicle in the event of a deviation of the vehicle from a setpoint trajectory, with the aim of keeping to the lane.

6. The driver assistance system according to claim 2, wherein the intervention arrangement is also configured for performing, during travel on a winding lane with the vehicle being positioned in an inside area of the lane and traveling below a threshold value of the transverse acceleration, a slight intervention in the steering system of the vehicle in the event of a deviation of the vehicle from a setpoint trajectory, with the aim of keeping to the lane.

7. The driver assistance system according to claim 2, wherein, during travel on a winding lane with the vehicle being positioned in an inside area of the lane and traveling above a threshold value of the transverse acceleration, there is no intervention performed in the steering system of the vehicle in the event of a deviation of the vehicle from a setpoint trajectory, with the aim of keeping to the lane.

8. The driver assistance system according to claim 1, wherein the intervention arrangement is also configured for performing, during travel on a lane which has substantially no curve, a slight intervention in the steering system of the vehicle in the event of a deviation of the vehicle from a setpoint trajectory, with the aim of keeping to the lane.

9. The driver assistance system according to claim 2, wherein the intervention arrangement is also configured for performing, during an approach to an outer curve, an intervention of steering whose intensity increases with the tightness of the curve or the speed of negotiating the curve.

10. The driver assistance system according to claim 2, wherein the intervention arrangement is also configured for performing, during an approach to an inner-curve lane marking, an intervention of steering whose intensity decreases with the tightness of the curve or the speed of negotiating the curve.

11. The driver assistance system according to claim 2, wherein the intervention arrangement is also configured for performing, during an approach to an outer curve, an intervention of steering whose intensity increases with the tightness of the curve or the speed of negotiating the curve, and is configured for performing, during an approach to an inner-curve lane marking, an intervention of steering whose intensity decreases with the tightness of the curve or the speed of negotiating the curve.

* * * * *

UNITED STATES PATENT AND TRADEMARK OFFICE
CERTIFICATE OF CORRECTION

PATENT NO. : 8,370,023 B2  
APPLICATION NO. : 12/083271  
DATED : February 5, 2013  
INVENTOR(S) : Alexander Maass It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1315 days.

Signed and Sealed this

First Day of September, 2015

Michelle K. Lee  
*Director of the United States Patent and Trademark Office*